United States Patent [19]

Hohmann et al.

[11] 4,203,885

[45] May 20, 1980

[54] PROCESS FOR THE MONONITRATION OF ANTHRAQUINONE

[75] Inventors: Walter Hohmann; Klaus Wunderlich, both of Leverkusen; Helmut Seidler, Bonn-Bad Godesberg, all of Fed. Rep. of Germany

[73] Assignee: Bayer Aktiengesellschaft, Leverkusen, Fed. Rep. of Germany

[21] Appl. No.: 952,358

[22] Filed: Oct. 18, 1978

Related U.S. Application Data

[63] Continuation of Ser. No. 835,938, Sep. 22, 1977, abandoned.

[30] Foreign Application Priority Data

Oct. 15, 1976 [DE] Fed. Rep. of Germany ....... 2646649

[51] Int. Cl.$^2$ ............................................. C07C 49/68
[52] U.S. Cl. ...................................................... 260/369
[58] Field of Search ......................................... 260/369

[56] References Cited

U.S. PATENT DOCUMENTS

4,012,426   3/1977   Toth ................................... 260/369

FOREIGN PATENT DOCUMENTS

50-50352   5/1975   Japan .

OTHER PUBLICATIONS

Okada, Tsugio et al., "1-Nitroanthraquinone" in Chemical Abstract No. 178651q, vol. 83, 1975, p. 536.
Stoeckelmann, Guenter et al., "1-Nitroanthraquinone by Continuous Nitration of Anthraquinone" in Chemical Abstract No. 115,367y, 7/1973, 94144(e), vol. 85, 1976.

Primary Examiner—Winston A. Douglas
Assistant Examiner—Raymond K. Covington
Attorney, Agent, or Firm—Sprung, Felfe, Horn, Lynch & Kramer

[57] ABSTRACT

A process has been developed for the mononitration of anthraquinone to 1-nitroanthraquinone with nitric acid/sulphuric acid mixtures wherein anthraquinone is nitrated in a nitric acid/sulphuric acid mixture, in which the weight ratio of nitric acid to sulphuric acid is about 1:1 to about 2:1, in which the weight ratio of sulphuric acid to anthraquinone is about 0.5:1 to about 1:1 and in which the weight ratio of sulphuric acid to water is about 2.5:1 to about 5.5:1, the weight ratios relating to the sum of the materials employed, at temperatures in the range from about 45° to 70° C. until the anthraquinone content is less than 3% by weight, relative to the sum of the anthraquinone compounds.

13 Claims, No Drawings

PROCESS FOR THE MONONITRATION OF ANTHRAQUINONE

This is a continuation of application Ser. No. 835,938, filed Sept. 22, 1977 now abandoned.

The present invention relates to a process for the mononitration of anthraquinone with sulphuric acid/nitric acid mixtures, it being possible to obtain 1-nitroanthraquinone in high yields.

A number of processes for the mononitration of anthraquinone are known in which the nitration of anthraquinone is carried out either with nitric acid alone or with mixtures of nitric acid and other substances (see, for example, U.S. Pat. No. 2,874,168, DT-OS's (German Published Specifications) Nos 2,103,360, 2,232,464 and 2,241,627 and Polish Pat. No. 46,428). These processes are disadvantageous since they require long reaction times and/or the use of relatively large amounts of mineral acids. Very aggressive reagents are also used in some of these processes, so that particularly corrosion-resistant materials must be used for the manufacture of the required equipment.

Processes for the mononitration of anthraquinone with sulphuric acid/nitric acid mixtures have also already been known for a long time, see, for example, Liebermann, Berichte 16, page 54 (1883). In this process, when the nitration is carried out to such an extent that less than 5% of unreacted anthraquinone remains in the reaction product, 1-nitroanthraquinone is obtained in yields of only about 60%. The poor yields are caused by the fact that the anthraquinone formed cannot be sufficiently protected against being further nitrated to dinitroanthraquinones. This situation has been referred to in various instances, for example in DT-AS (German Published Specification) No. 2,039,822.

A process for the preparation of 1-nitroanthraquinone by nitrating anthraquinone in sulphuric acid is also described in DT-AS (German Published Specification) No. 2,039,822, in which the nitration of the anthraquinone is carried out in a heterogeneous phase in 75 to 82% strength sulphuric acid in the temperature range from approximately 20° to approximately 60° C., until approximately 75% by weight of 1-nitroanthraquinone are formed. According to Example 1 of this DT-AS (German Published Specification), 51 parts of 98% strength nitric acid are employed per 160 parts of 78% strength sulphuric acid, that is to say a substantially smaller amount of nitric acid than sulphuric acid. The disadvantages of this process are the long reaction times required (according to Example 1, 12 to 15 hours) and the sensitivity of the course of the reaction towards variations in the temperature and the concentration of the nitrating acid, which is expressly referred to in DT-OS (German Published Specification) No. 2,204,516. A further serious disadvantage of the process in DT-AS (German Published Specification) No. 2,039,822 is that large amounts of sulphuric acid are required, relative to anthraquinone, which either must be worked up, with high costs, after the reaction has ended or lead to severe pollution of the effluent. These disadvantages are already pointed out in DT-OS (German Published Specification) No. 2,233,185.

Even the processes according to DT-OS's (German Published Specifications) Nos. 2,204,516 and 2,233,185 do not completely remove the disadvantages of the process according to DT-AS (German Published Specification) No. 2,039,822, since according to DT-OS (German Published Specification) No. 2,204,516 the reaction is likewise carried out with relatively high amounts of acid, relative to anthraquinone, and according to DT-OS (German Published Specification) No. 2,233,185, although a substantially smaller amount of acid is employed, relative to anthraquinone, in addition, the reaction must be carried out in the presence of an inert organic solvent.

A process has now been found for the mononitration of anthraquinone with nitric acid/sulphuric acid mixtures, which is characterised in that anthraquinone is nitrated in a nitric acid/sulphuric acid mixture, in which the weight ratio of nitric acid to sulphuric acid is about 1:1 to about 2:1, in which the weight ratio of sulphuric acid to anthraquinone is about 0.5:1 to about 1:1 and in which the weight ratio of sulphuric acid to water is about 2.5:1 to about 5.5:1, the weight ratios relating to the sum of the materials employed, at temperatures in the range from about 45° to 70° C. until the anthraquinone content is less than 3% by weight, relative to the sum of the anthraquinone compounds.

The process according to the invention can be carried out at temperatures from about 45° to 70° C., advantageously at temperatures in the range from about 48° to 60° C.

Furthermore, it is advantageous to carry out the initial phase of the nitration at relatively low temperatures within the ranges indicated and to raise the reaction temperature to relatively higher temperatures within the ranges indicated with the progressive formation of mononitroanthraquinone. It is particularly preferable to carry out the initial phase of the nitration at low temperatures in the range from about 45° to 55° C., preferably in the range from about 48° to 53° C., and, after over 50% of the anthraquinone employed has been mononitrated, to raise the temperature to about 55° to 70°, preferably to about 60° C. When the anthraquinone content in the nitration mixture has reached a value of about 3% by weight, relative to the sum of all the anthraquinone compounds, it is advantageous to maintain a maximum reaction temperature of about 60° C. for no longer than one hour, otherwise there is the possibility that the mononitroanthraquinones, above all 1-nitroanthraquinone, react further to an appreciable extent to give dinitroanthraquinones.

The process according to the invention can be carried out in various ways. For example, it is possible initially to introduce the entire nitric acid/sulphuric acid mixture and to introduce the anthraquinone into this. The introduction of the anthraquinone can take place all at once or in the course of up to 3 hours. The procedure can also be to meter the nitric acid/sulphuric acid mixture and the anthraquinone, separately but synchronously, into a mixture in which the reaction has gone to completion, fully or partially. Furthermore, the procedure can be to carry out the process in a multi-stage reaction cascade, for example a kettle cascade, and to carry out the metering of the nitric acid/sulphuric acid mixture and of the anthraquinone into the first element of the reaction cascade synchronously in a continuous process. The process according to the invention can also be carried out in a reaction tube and the nitric acid/sulphuric acid mixture and the anthraquinone can be metered into a reaction tube synchronously in a continuous process. The procedure can also be to stir all or part of the anthraquinone into a portion of the nitric acid/sulphuric acid mixture, the water content of which is, for example, above 22% by weight, and to meter in the remainder of the nitric acid/sulphuric acid mixture, with a water content of, for example, below 5% by weight, and if appropriate the remaining anthraquinone about 0.5 to 3 hours later. In the latter case, the nitration takes place only slowly in the mixed acid containing a relatively high proportion of water (water content, for example, over 22% by weight) and starts at an appreciable rate only when the nitric acid/sulphric acid mixture which is anhydrous or contains little water (water content, for example, below 5% by weight) is added. This procedure is advantageous when, for example for reasons of heat removal, the anthraquinone must be added slowly in the initial phase, that is to say the HNO₃/anthraquinone ratio is >2. Overnitration is then avoided, which would be obtained if a mixed acid were employed, the water content of which corresponds to that of the total mixed acid (=average value of all mixed acid portions added).

In the process according to the invention it is essential that a liquid phase, consisting predominantly of organic constituents, forms during the nitration reaction. In the following text, this phase is described as a "liquid organic phase". It forms under the weight ratios and temperatures indicated above and leads to the formation of an emulsion of the liquid organic phase of lower specific gravity, which is composed predominantly of anthraquinones and mixed acids, and an inorganic phase, which is also liquid and contains the remaining portions of nitric and sulphuric acid. In general, the liquid organic phase consists to the extent of more than 50% of anthraquinones and contains nitric acid and sulphuric acid in a weight ratio of over 3:1, preferably of over 4:1. The liquid inorganic phase contains the remaining portions of nitric and sulphuric acid (the proportion by weight of sulphuric acid exceeding that of nitric acid) and small amounts of organic substance in the dissolved form. The formation of a liquid organic phase is of decisive importance for the feasibility of the process according to the invention. On the one hand, it ensures that the further nitration of the 1-nitroanthraquinone formed and present in the liquid organic phase is retarded, and on the other hand it is thereby possible to carry out the nitration in very concentrated mixtures, that is to say with relatively low amounts of acid, relative to the anthraquinone employed. Thus, for example, the nitration mixture can still be industrially handled without problems with a content of over 50% by weight of anthraquinones; that is to say it remains stirrable and can be pumped without particular difficulties. The formation of a liquid organic phase has not hitherto been observed during the nitration of anthraquinone with nitric acid or nitric acid/sulphuric acid mixtures. In known processes for the nitration of anthraquinone in a heterogeneous phase, for example in the process of DT-AS (German Published Specification) No. 2,039,822, a liquid organic phase of this type does not occur, but a solid phase which contains virtually only anthraquinones. Even when the temperature is raised during or after the addition of the nitric acid in Example 1, no liquid organic phase forms. If an attempt is made to carry out the procedure of DT-AS (German Published Specification) No. 2,039,822 in the temperature range claimed according to the invention with similar concentrations of anthraquinones as in the process according to the invention, the mixtures are no longer stirrable during the reaction because no liquid organic phase appears (see Example 13). On the other hand, with the process according to the invention it is possible to introduce a large proportion of the anthraquinone only when a liquid organic phase has already formed. Stirring in larger amounts of anthraquinone then presents no difficulty from the point of view of consistency since it is taken up in the liquid organic phase, the fluidity of the reaction mixture being maintained completely.

The nitration in accordance with the process according to the invention is possibly an interfacial reaction. If the inorganic liquid phase is separated off by suitable operations, for example by centrifuging, the reaction soon stops, although the organic phase contains relatively large amounts of nitric acid. After adding the inorganic phase which has been separated off or fresh sulphuric acid, the reaction starts again. Thus good, thorough mixing of the two phases by vigorous stirring or other suitable measures should be provided for during the reaction.

The cause of the formation of the liquid organic phase is probably the formation of an anthraquinone/nitric acid adduct, and in particular an adduct in the molar ratio of anthraquinone to nitric acid of 2:1 or 3:1. The composition of the phases during the reaction gives indications of this. In the stage of maximum de-mixing, which is the stage at which the organic liquid phase has an optimum liquid consistency, a marked concentration of nitric acid is observed in the organic liquid phase with a corresponding dilution in the inorganic liquid phase. The nitric acid in the inorganic phase becomes markedly more concentrated again at the rate at which the liquid organic phase decomposes, with the separation of solid nitroanthraquinone (see Example 12). During the decomposition of the liquid organic phase, the 1-nitroanthraquinone is obtained in a particularly compact form, so that in spite of their high anthraquinone proportion, the reaction mixtures remain readily stirrable even in the final phase of the nitration. However, the indications found for explaining the course of the reaction according to the invention and the formation and decomposition of the liquid organic phase do not limit the process according to the invention to any theory of the course of the reaction and of the formation and decomposition of the liquid organic phase. The above explanations serve only to illustrate the process according to the invention, no claim to the correctness of the explanations with regard to the course of the reaction and the formation and decomposition of the liquid organic phase being made.

In order to obtain a liquid organic phase during the nitration according to the invention it is necessary to maintain certain nitrating conditions. Thus, the proportion of anthraquinone in the nitration mixture should initially be at least about 20% by weight, preferably at least about 30% by weight. The weight ratio of nitric acid to sulphuric acid in the process according to the invention is initially about 1:1 to about 2:1, for example 1:1 to 2:1, preferably 1.2:1 to 1.5:1. The weight ratio of sulphuric acid to anthraquinone in the process according to the invention is initially about 0.5:1 to 1:1, for example 0.5:1 to 1:1, preferably 0.6:1 to 0.8:1. The weight ratio of sulphuric acid to water in the process according to the invention is initially about 2.5:1 to about 5.5:1, for example 2.5:1 to 5.5:1, preferably 3.5:1 to 5.3:1. The weight ratios indicated relate to the sum of all the materials employed. The process according to the invention is carried out at temperatures in the range from about 45° to 70° C., preferably at temperatures in the range from about 48° to 60° C. In general, the sulphuric acid employed in the process according to the invention has a concentration in the range from about 70 to 85% by weight, preferably in the range from about 74 to 84% by weight, the total amount of water in the mixed acid being attributed to the sulphuric acid, and the nitric acid is employed in a concentration of about 90 to 100% by weight, preferably about 97 to 99% by weight. These data, above all for the concentrations and weight ratios, relate to the total amount of material employed; partial amounts employed can certainly be outside these ranges indicated, for example when mixed acid, which contains little water or is anhydrous, is subsequently metered into a nitration mixture which initially contains a high proportion of water, as described in Example 10 and 11, or when anthraquinone is slowly introduced into large amounts of $H_2SO_4$ and/or nitric acid at the start of the reaction, as described, for example, in Example 5.

In order to obtain high yields of 1-nitroanthraquinone in accordance with the process according to the invention, it is advantageous to match the measures to be taken with one another so that a further nitration of the 1-nitroanthraquinone is largely avoided. Although the appearance of the liquid organic phase makes the reaction more insensitive towards further nitration, in principle it does not prevent a further nitration of mononitroanthraquinones to dinitroanthraquinones. Thus, for example, the higher the water content of the sulphuric acid and the higher the anthraquinone proportion in the nitration mixture, the more the weight ratio of nitric acid to sulphuric acid can be shifted in favour of the nitric acid. Furthermore, it is advantageous, for example, to carry out the reaction (a) with a particular weight ratio of sulphuric acid to water and with a high weight ratio of sulphuric acid to anthraquinone at a high weight ratio of nitric acid to sulphuric acid, (b) with a particular weight ratio of sulphuric acid to anthraquinone and with a high weight ratio of nitric acid to sulphuric acid at a low weight ratio of sulphuric acid to water and (c) with a high weight ratio of nitric acid to sulphuric acid and with a high weight ratio of sulphuric acid to anthraquinone at a low weight ratio of sulphuric acid to water and vice versa.

The terms "high weight ratio" and "low weight ratio" denote, in each case, high or, respectively, low weight ratios within the limits indicated.

The temperature should not fall below about 45° C. in the process according to the invention, since otherwise the liquid organic phase begins to solidify and as the reaction progresses there is the danger that the mixture no longer remains stirrable. (Compare Example 1b). On the other hand, temperatures of about 70° C., preferably of about 60° C., should not be exceeded, since at higher temperatures dinitroanthraquinone forms to an increasing extent and/or anthraquinone and nitroanthraquinones are degraded by oxidation. Since considerable amounts of heat are released during the nitration reaction according to the invention it is necessary, in general, to remove some or all of the heat of the reaction and thus to avoid too high an increase in the temperature in the reaction mixture. The heat can be removed in any desired manner, for example by cooling the walls with water, brine or vaporising ammonia, by evaporative cooling by allowing excess nitric acid to distil under reflux, preferably under reduced pressure, or by external cooling surfaces outside the reactor, for example using a loop reactor.

The reaction time should be chosen so that after an anthraquinone content in the nitration mixture of less than 3% by weight, preferably of about 2 to 3% by weight (in each case relative to the sum of the anthraquinone compounds) is reached, the reaction mixture is after-treated for no longer than 2 hours, preferably no longer than 1 hour, at maximum temperatures of about 60° C. Dinitroanthraquinones can otherwise form to an appreciable extent, so that in spite of a decrease in the anthraquinone content, no further increase in the yield of 1-nitroanthraquinone takes place. In general, the reaction time is between about 2 and 7 hours, preferably between about 3 and 5 hours, in general the time required being a little greater for the continuous procedure than for the discontinuous procedure.

At least 2 mols of nitric acid per mol of anthraquinone employed are required for the process according to the invention. However, it is advantageous when about 2.5 to 4 mols, preferably about 2.7 to 3.5 mols, of nitric acid are used per mol of anthraquinone employed.

The particle size of the anthraquinone to be employed in the process according to the invention is not critical, since on the one hand relatively large anthraquinone particles are thoroughly nitrated in the liquid organic phase and on the other hand very fine anthraquinone particles lead to no particular thickening of the reaction mixtures.

The process according to the invention is not as sensitive towards variations in the sulphuric acid concentration as other processes, for example the process according to DT-AS (German Published Specification) No. 2,039,822. As a result of running the process according to the invention at very high concentrations, a lowering of the sulphuric acid concentration of up to 10% by weight is achieved during the reaction by the water of reaction liberated. Towards the end of the reaction, acid concentration ranges are thereby automatically obtained in which nitric acid possesses no more than slight nitrating action. For this reason, variations in the amount of nitric acid are also not as critical as in other processes.

The process according to the invention can be carried out in various advantageous variants. The following variants may be mentioned as examples:

Variant 1:

100 parts by weight of anthraquinone are introduced into a mixed acid, which contains 60 to 80 parts by weight of sulphuric acid (100% strength by weight), 100 to 85 parts by weight of nitric acid (100% strength by weight) and 15 to 18 parts by weight of water, at 48° to 52° C. The nitration is carried out at temperatures from 50° to 60° C. until less than 3% by weight of anthraquinone (relative to the sum of the anthraquinone compounds) can be detected in the nitration mixture, which in general takes about 2 to 5 hours. In this procedure, numerically relatively small amounts of $H_2SO_4$ and water are preferably combined with numerically higher values of $HNO_3$, within the ranges indicated, and vice versa.

Variant 2:

80 to 100 parts by weight of anthraquinone are introduced into 100 to 150 parts by weight of a 72 to 78% strength by weight sulphuric acid at 20° to 50° C., 80 to 110 parts by weight of nitric acid (98% strength by weight) are added, and then a further 100 to 120 parts by weight of anthraquinone and 120 to 150 parts by weight of a mixed acid consisting of 35 to 45% by weight of sulphuric acid (100% strength by weight), 63 to 52% by weight of nitric acid (100% strength by weight) and 2 to 3% by weight of water are added simultaneously. The nitration is carried out at temperatures from 50° to 60° C. until less than 3% by weight of anthraquinone (relative to the sum of the anthraquinone compounds) can be detected in the nitration mixture, which in general takes 2 to 5 hours. In this procedure, in each case numerical values close to the numbers first mentioned or numerical values close to the numbers last mentioned are preferably combined with one another, within the ranges indicated.

Variant 3:

10 to 20% of a preceding mixture, in which the reaction has ended, having the composition of 42 to 46% of crude 1-nitroanthraquinone (1-nitroanthraquinone content about 75%) and 54 to 58% of a mixed acid consisting of 38 to 40% of nitric acid (100% strength), 46 to 44% of sulphuric acid (100% strength) and 14 to 16% of water are retained. The 9-fold to 4-fold amount of anthraquinone and mixed acid are introduced simultaneously into this retained portion of a preceding mixture in the course of 1 to 5 hours, 160 to 210 parts by weight of mixed acid being introduced per 100 parts by weight of anthraquinone, the mixed acid containing 40 to 35% by weight of sulphuric acid (100% strength), 52 to 53% by weight of nitric acid (100% strength) and 8 to 11% of water. The nitration is carried out at temperatures in the range from 48° to 60° C. until only less than 3% by weight of anthraquinone (relative to the sum of the anthraquinone compounds) can be detected in the nitration mixture, which in general takes about 2 to 5 hours. In this procedure, in each case numerical values close to the numbers first mentioned or numerical values close to the numbers last mentioned are preferably combined with one another, within the ranges indicated.

The process according to the invention can be carried out both discontinuously and continuously; a continuous procedure in which, for example, the process is carried out in a reaction tube or a kettle cascade, is particularly advantageous. In order to obtain a high α-nitration rate, it is advisable to begin the nitration close to the lower temperature limit, for example at 45° to 50° C., and only to proceed to higher temperatures, for example to 55° to 65° C., when at least 75% of the anthraquinone are nitrated.

The reaction mixture can be worked up in a manner which is in itself known, for example by metering the nitration mixture into water or metering water into the nitration mixture, whereupon a product mixture precipitates. This is appropriately filtered off or centrifuged, washed with water until neutral and then dried. If the nitration mixture is diluted with an amount of water such that the acid content of the mixture is below 50%, the nitroanthraquinones present and unreacted anthraquinone precipitate almost completely. After these compounds have been separated off, a mixture of sulphuric acid and nitric acid containing a high proportion of water remains, which is virtually free from organic constituents and salts.

This mixture is advantageously separated into its constituents by distillation and used again for further nitrations. In this procedure, it is possible either to initially distil off nitric acid and water until an about 70% strength sulphuric acid which is virtually free from nitric acid remains, in the sump, which is then processed to concentrated sulphuric acid, water being distilled off, for example in a Plinke installation. It is also possible initially to add an amount of concentrated sulphuric acid such that at least 70% strength acid is present, relative to sulphuric acid and water, from which nitric acid is then distilled off as highly concentrated nitric acid, whilst the sump which remains, containing sulphuric acid, is concentrated, for example in a Plinke installation. Organic substances, which may be contained in the filtrate or centrifugate obtained by separating off the reaction products, are broken down by oxidation during an acid regeneration of this type. If a working-up of the acid is carried out in accordance with the above procedure and the nitric acid and sulphuric acid thus obtained are re-used and the wash water is used for diluting the nitration melts, as described in Example 3, no effluent at all is obtained in the process according to the invention.

As already indicated above, the nitration according to the invention is carried out until the anthraquinone content in the nitration mixture (relative to the sum of the anthraquinone compounds) has fallen to less than 3% by weight, preferably to $\leq 2$. The determination of the anthraquinone content in the nitration mixture required for this can be carried out in a manner which is in itself known. For example, an analysis by means of quantitative thin layer chromatography or high pressure liquid chromatography gives results which can be easily reproduced, so that the reaction time established once for given apparatus conditions and other conditions no longer have to be checked continuously.

After the nitration mixture has been worked up, in particular the nitration mixtures obtained in accordance with Variants 1 to 3, a product mixture is obtained which contains over 73% of 1-nitroanthraquinone, less than 3-4% of anthraquinone and, in total, less than 10%, preferably less than 7%, of 1,5- and 1,8-dinitroanthraquinone. In general, the yield of 1-nitroanthraquinone is about 74 to 80%, relative to anthraquinone employed, for the theoretical yield calculated from the reaction equation.

The process according to the invention has a number of advantages. Thus, in comparison with known processes, the nitration can be carried out with only small amounts of mineral acid, it being possible for the anthraquinone proportions in the nitration mixture to be over 50%. Therefore, the space/time yields can be several times greater, for example in comparison with the process according to DT-AS (German Published Specification) No. 2,039,822, which also additionally requires a considerably longer reaction time. The process according to the invention is not particularly sensitive towards variations in the nitric acid and/or sulphuric acid concentration. As a result of running the process at very high concentrations, a reduction in the sulphuric acid concentration of up to 10% is achieved during the process by the liberation of the water of reaction, so that towards the end of the reaction acid concentration ranges in which the nitric acid has no more than a slight nitrating action are automatically obtained. In contrast with this, for example, the sulphuric acid concentration in the process according to DT-AS (German Published Specification) No. 2,039,822 must be kept to exactly, since the water of reaction liberated does not have such a marked effect on the concentration of the acids there because of the large excesses of acids to be used. From Example 1 in DT-AS (German Published Specification) No. 2,039,822, for example, a sulphuric acid concentration of 77.6% is calculated in the initial state, and one of 76.9% in the final state. From this it is evident that in the process in DT-AS (German Published Specification) No. 2,039,822, variations in the concentration of the sulphuric acid employed have a much greater effect on the course of the reaction than in the process according to the invention. The amount and concentration of $HNO_3$ are also to be rated more critical. A further advantage of the process according to the invention is that the individual parameters can be matched with one another so that the nitration rate over long stretches of the nitration can be kept constant, so that the heat of reaction liberated per unit of time remains almost constant and can be removed in a relatively simple manner. Finally, it is to be pointed out that in the process according to the invention it is not necessary to employ anthraquinone in a particular form, for example finely sieved. The yields and purities of the 1-nitroanthraquinone which is accessible according to the invention are the same or better than in other processes. In general, no more than 20 to 23% of by-products arise, in particular no more than a total of 10% of 1,5- and 1,8-dinitroanthraquinone, in general even less than 8%.

As is known, 1-nitroanthraquinone is an important industrial intermediate product, which can be used, for example, for the preparation of 1-aminoanthraquinone, from which many anthraquinone dyestuffs can be prepared. The 1-nitroanthraquinone prepared according to the invention can be reduced directly to 1-aminoanthraquinone in a known manner, for example by treatment with an aqueous solution of sodium sulphide. However, if a still purer product is desired, it can also be further purified by known processes, for example by treatment with aqueous solutions of sodium sulphite (see U.S. Pat. No. 2,302,729) or by treatment with acid amides (see DT-AS (German Published Specification) No. 2,039,822).

The percentage data in the examples which follow relate to the weight, unless otherwise indicated. If the content data for mineral acids or mineral acid mixtures are given in percent, the deficit to make up to 100% is water.

EXAMPLES

EXAMPLE 1

(a) 150 g of a nitration mixture, in which the reaction has ended, which contains 68 g of crude 1-nitroanthraquinone (composition, see the table on page 21) are initially introduced into a cylindriccal reaction vessel (1.5 l capacity, diameter 10 cm, height 20 cm) which has a lid fitted with 4 tubes and is provided with an anchor stirrer (diameter 9 cm, height 12 cm), thermometer, cooler and dropping funnel. 500 g of technical anthraquinone (99% pure) and 890 g of mixed acid of the following composition: 351 g of $H_2SO_4$ (100% strength), 464 g of $HNO_3$ (100% strength) and 76.5 g of $H_2O$ are introduced into this mixture uniformly and separately, but with synchronous metering, at 48° to 50° C. in the course of 3 hours at a stirring speed of 200 revolutions/minute. During this procedure, the temperature is adjusted to 49° to 51° C. After 10 to 20% of the materials employed have been introduced, a two phase system forms which exhibits a great de-mixing tendency. It consists of a liquid, clear, inorganic phase of higher specific gravity which consists of mixed acid, in which small portions of anthraquinone or nitrated anthraquinone are dissolved, and an organic phase, which is also completely or predominantly liquid, of lower specific gravity consisting of anthraquinone, nitroanthraquinone, nitric acid and small proportions of sulphuric acid. This two-phase system remains during the entire metering-in time.

After the metering-in has ended, the mixture is stirred for a further one hour at 50° C. and finally for a further 3 hours at 60° C. During this procedure, the liquid organic phase gradually passes into a solid phase with an increasing degree of nitration of the anthraquinone, whereupon a continuous thickening of the mixture can be observed, but it remains easily stirrable until the end of the reaction. During the reaction, representative average samples (about 5 g) are removed, whilst stirring, and stirred into water and the precipitate is filtered off, washed with hot water until neutral and dried. The dried samples are analysed by the method of high pressure liquid chromatography. The results in the table on page 21 are obtained:

(b) The procedure followed is as described in (a), but the process is carried out at 38°–40°. No liquid organic phase forms and the reaction mixture becomes very thick; after about half has been metered in, the mixture is no longer stirrable and a regulated temperature control is no longer possible.

If the temperature is now increased to 45°, the mass can be set in motion with some difficulty; the mixture becomes stirrable again only when the temperature is further raised to 48°–50°, and when the metering-in is continued a liquid organic phase forms.

| Time after the start of the experiment (minutes) | Amount of A'non introduced | Temperature | Analyses (%) | | | | | | | | |
|---|---|---|---|---|---|---|---|---|---|---|---|
| | | | A'non | 1-NA | 2-NA | 1,6-DNA | 1,7-DNA | 1,5-DNA | 1,8-DNA | 2,6- + 2,7-DNA | Other substances |
| 36 | 100 | 50° | 51.8 | 37.6 | 3.0 | 1.9 | 1.8 | 2.2 | 1.7 | 0.2 | — |
| 72 | 200 | 50° | 49.5 | 38.6 | 3.4 | 1.6 | 1.5 | 1.8 | 1.4 | 0.1 | 2.1 |
| 108 | 300 | 50° | 36.8 | 49.5 | 5.6 | 1.5 | 1.5 | 2.2 | 1.9 | 0.1 | 0.9 |
| 144 | 400 | 50° | 31.8 | 52.1 | 6.5 | 1.5 | 1.5 | 2.2 | 1.9 | 0.1 | 2.4 |
| 180 | 500 | 50° | 30.8 | 53.2 | 7.1 | 1.5 | 1.5 | 2.7 | 2.5 | 0.1 | 0.6 |
| 210 | 500 | 50° | 21.5 | 59.8 | 7.8 | 1.9 | 1.8 | 2.8 | 2.4 | 0.1 | 1.9 |
| 240 | 500 | 50° | 17.0 | 63.7 | 8.3 | 2.0 | 2.0 | 2.9 | 2.5 | 0.2 | 1.4 |
| | | (→ 60°) | | | | | | | | | |
| 300 | 500 | 60° | 6.4 | 71.4 | 9.0 | 2.5 | 2.5 | 3.2 | 3.1 | 0.2 | 1.7 |
| 360 | 500 | 60° | 3.3 | 73.3 | 8.7 | 2.9 | 2.9 | 3.5 | 3.2 | 0.2 | 2.0 |

-continued

| Time after the start of the experiment (minutes) | Amount of A'non introduced | Temperature | Analyses (%) | | | | | | | | |
|---|---|---|---|---|---|---|---|---|---|---|---|
| | | | A'non | 1-NA | 2-NA | 1,6-DNA | 1,7-DNA | 1,5-DNA | 1,8-DNA | 2,6- + 2,7-DNA | Other substances |
| 420 | 500 | 60° | 2.1 | 73.8 | 8.3 | 3.2 | 3.2 | 3.6 | 3.3 | 0.2 | 2.3 |

150 g of a mixture, in which the reaction was ended, the proportion of anthraquinones in which after 420 minutes had approximately the composition indicated in the Table, serve as the nitration mixture employed.
A'non = anthraquinone
1-NA = 1-nitroanthraquinone
1,6-DNA = 1,6-dinitroanthraquinone

EXAMPLE 2

The procedure followed is as in Example 1, but the taking of samples is dispensed with and the entire mixture is worked up as follows: the mixture is stirred into 5 l of cold water, stirred for a further ½ hour at 60° C. and the precipitate is filtered off, washed with hot water until neutral and dried in vacuo at 120° C. The yield of product thus obtained is 685 g. Composition: 1.9% of anthraquinone, 73.9% of 1-nitroanthraquinone, 8.0% of 2-nitroanthraquinone, 3.2% of 1,6-dinitroanthraquinone, 3.4% of 1,7-dinitroanthraquinone, 3.6% of 1,5-dinitroanthraquinone, 3.4% 1,8-dinitroanthraquinone and 0.2% of 2,6-+2,7-dinitroanthraquinone.

The yield of 1-nitroanthraquinone is 75% of theory.

EXAMPLE 3

10,000 g of anthraquinone (99% pure) and 16,100 g of mixed acid (composition: 52.1% of HNO₃ (100% strength), 39.3% of H₂SO₄ (100% strength) and 8.6% of H₂O) per hour are metered synchronously at 48° to 50° C. into the first element of a four-stage cascade (three-stage reaction cascade+dilution cascade) with a capacity of 35 l in each element and is provided with a charging screw and mixed acid metering pump on cascade 1, a water metering pump on cascade 4 and water jackets, which can be heated and cooled, on cascades 1 to 4, whilst stirring vigorously. The washing 1 from the filtration of the 1-nitroanthraquinone obtained (about 18,900 g/hour) is metered synchronously into cascade 4 at the same time.

The temperatures in the individual elements of the cascade are adjusted as follows: cascade 1 48°–50° C., cascade 2 54°–56° C., cascade 3 59°–61° C. and cascade 4 58°–62° C.

The working-up is carried out by filtering continuously the overflow from cascade 4 on a rotary filter and washing the material on the filter with water at 60° C. in two different zones. In the first zone, 17,900 g of water per hour are added and the filtrate obtainable in this procedure (washing 1), which is obtained in an amount of about 18,900 g/hour, is used for the dilution in cascade 4. 12,400 g of water per hour are fed into the second zone. The filtrate obtainable in this procedure (washing 2) can be fed to the biological processing of the effluent.

The material on the filter, washed until neutral, is thoroughly dried in vacuo. 12,550 g of product of the following composition are obtained per hour: 3.0% of anthraquinone, 6.7% of 2-nitroanthraquinone, 73.6% of 1-nitroanthraquinone, 4.0% of 1,6-dinitroanthraquinone, 3.8% of 1,7-dinitroanthraquinone, 3.8% of 1,5-dinitroanthraquinone, 3.4% of 1,8-dinitroanthraquinone, 0.6% of 2,7-+2,6-dinitroanthraquinone and 1.1% of other substances.

The yield of 1-nitroanthraquinone is 75.9% of theory.

The working-up of the mother liquor from the filtration on the rotary pressure filter was carried out in 2 variants.

(a) By the method which is in itself known and which is named "Schott variant", the nitric acid was distilled off as water-containing nitric acid.

(b) By the method which is in itself known and which is named "extractive distillation", an amount of anhydrous or 96% strength sulphuric acid was added initially such that, relating the water content to sulphuric acid, a 70% strength acid was present, and the nitric acid was distilled off as highly concentrated nitric acid.

The approximately 70% strength sulphuric acid remaining as the distillation residue after (a) or (b) was concentrated to 96% strength sulphuric acid in a manner which is in itself known in a so-called Plinke installation, with water being distilled off. The acids thus obtained were fed again to the nitration process.

EXAMPLE 4

650 g of a mixed acid consisting of 320 g of HNO₃ (98% strength) and 250 g of H₂SO₄ (78% strength) are initially introduced into a reaction vessel as described in Example 1 and 500 g of anthraquinone are introduced in the course of 5 minutes, starting at 25° C. and stopping the rise in temperature at 52° to 54° C., whilst stirring vigorously. The mixture is stirred for a further hour at 50° C. and for a further 30 minutes at 60° C. 270 g of a mixed acid which consists of 150 g of HNO₃ (98% strength) and 120 g of H₂SO₄ (96% strength) are metered in at this temperature in the course of 30 minutes and the mixture is again stirred for a further 2 to 3 hours at 60° C.

About 10 to 15 minutes after the anthraquinone has been introduced, a two-phase system forms consisting of mixed acid and a completely or partially liquid organic phase, which gradually decomposes after the mixed acid has been added at 60° C., solid nitrated anthraquinone separating out.

The reaction mixture is worked up by stirring into 4,000 ml of water, stirring for ½ hour at 80° C., filtering the precipitate, washing the precipitate with water at 70° C. until neutral and drying the precipitate. 625 g of dry product are obtained which has the following composition: 2.4% of anthraquinone, 9.5% of 2-nitroanthraquinone, 74.9% of 1-nitroanthraquinone, 2.4% of 1,6-dinitroanthraquinone, 1.8% of 1,7-dinitroanthraquinone, 3.1% of 1,5-dinitroanthraquinone, 2.9% of 1,8-dinitroanthraquinone, 0.4% of 2,6-+2,7-dinitroanthraquinone and 2.6% of other substances.

The yield of 1-nitroanthraquinone is 77% of theory.

EXAMPLE 5

The procedure followed is as in Example 4, but the anthraquinone is introduced at a uniform rate in the course of 1 to 2 hours. The metering-in of the mixed acid, the after-treatment and the working-up are carried out as described in Example 4. 622 g of dry product are obtained with a 1-nitroanthraquinone content of 73.5%. The yield of 1-nitroanthraquinone is 74.9% of theory.

EXAMPLE 6

The procedure followed is as described in Example 1, but 500 g of anthraquinone are metered into a mixed acid which consists of 315 g of $H_2SO_4$ (100% strength), 400 g of $HNO_3$ (100% strength) and 65.5 g of $H_2O$. The mixture is stirred for a further 1 hour at 50° C. and for a further 5 hours at 60° C. After working up analogously to Example 2, 621 g of a 1-nitroanthraquinone mixture of the following composition are obtained: 2.0% of anthraquinone, 8.7% of 2-nitroanthraquinone, 73.5% of 1-nitroanthraquinone, 3.4% of 1,6-dinitroanthraquinone, 3.3% of 1,7-dinitroanthraquinone, 3.4% of 1,5-dinitroanthraquinone, 3.0% of 1,8-dinitroanthraquinone, 0.6% of 2,6-+2,7-dinitroanthraquinone and 2.1% of other substances.

The yield of 1-nitroanthraquinone is 74.9% of theory.

EXAMPLE 7

300 g of anthraquinone are stirred into 375 g of $H_2SO_4$ (82% strength) and 420 g of $HNO_3$ (98% strength) are added dropwise at 50° to 55° C. in the course of 2 hours. During this procedure, the initially thick mixture becomes more fluid after about 3/4 to 1 hour, and after 1 1/4 hours a liquid organic phase forms which, however, still contains solid constituents. At this point in time, a further 200 g of anthraquinone are added. After the dropwise addition of the nitric acid has ended, the mixture is stirred for a further 1 hour at 50° C., warmed to 60° C. and a mixture of 43 g of monohydrate (=100% strength sulpuric acid) and 53 g of $HNO_3$ (98% strength) is added at this temperature in the course of 15 minutes. The mixture is finally stirred for a further 2 hours at 60° C.

After stirring the reaction mixture into 3,000 ml of water, filtering off the precipitate, washing until neutral and drying, 627 g of a 1-nitroanthraquinone mixture of the following composition are obtained: 1.2% of anthraquinone, 7.5% of 2-nitroanthraquinone, 75.4% of 1-nitroanthraquinone, 3.4% of 1,6-dinitroanthraquinone, 3.2% of 1,7-dinitroanthraquinone, 3.2% of 1,5-dimitroanthraquinone, 3.2% of 1,8-dinitroanthraquinone and 0.5% of 2,6-+2,7-dinitroanthraquinone.

The yield of 1-nitroanthraquinone is 77.5% of theory.

EXAMPLE 8

(a) The procedure followed is as described in Example 4, but after the anthraquinone has been introduced the process is carried out in vacuo (about 70 to 100 mm Hg), so that the excess $HNO_3$ distils and condenses in an intensive condenser, mounted on the reaction vessel and fed with brine at −20° C. as the cooling liquid, and runs back into the reaction mixture. A constant nitric acid distillation is ensured during the entire reaction. The heat of the nitration reaction is initially sufficient for this; towards the end of the reaction it is necessary to heat the reaction vessel.

After working up, 620 g of a 1-nitroanthraquinone mixture are obtained. The 1-nitroanthraquinone content is 73.8% and the anthraquinone content is 3.0%. The yield of 1-nitroanthraquinone is 75.2% of theory.

(b) The procedure followed is as described in (a), but the heating of the reaction vessel is dispensed with. As soon as the temperature in the reaction mixture falls below the desired temperature, the vacuum is removed and the reaction is completed as described in Example 4.

EXAMPLE 9

(a) The procedure followed is as described in Example 4, but during the reaction the nitration mixture is circulated via a water-cooled Liebig condenser installed outside the reaction vessel. In this case also, the reaction vessel must be heated towards the end of the reaction so that the reaction temperature can be maintained. After working up, 620 g of a 1-nitroanthraquinone mixture are obtained. The 1-nitroanthraquinone content is 73.8% and the anthraquinone content is 2.9%. The yield of 1-nitroanthraquinone is 75.2% of theory.

(b) When the desired temperature in the reaction vessel can no longer be maintained by the heat of reaction alone, it is also possible to dispense with the circulation and to complete the reaction as described in Example 4.

EXAMPLE 10

230 g of $H_2SO_4$ (74% strength) are initially introduced into a cylindrical reaction vessel, 150 g of anthraquinone are stirred into this and 235 g of $HNO_3$ (98% strength) are added dropwise in the course of 1 hour. During this procedure, the temperature rises to about 40° C. 430 g of a mixed acid consisting of 235 g of $HNO_3$ (98% strength) and 195 g of $H_2SO_4$ (96% strength) are now added at a uniform rate in the course of 2 hours. During this procedure the temperature rises to 50° to 52° C. This temperature is maintained during the further course of the reaction. When about 25% of the mixed acid have been added, an emulsion is obtained, into which a further 350 g of anthraquinone are stirred in the course of 10 minutes. After the addition of the mixed acid has ended, the mixture is stirred for a further half hour at 50° C. and then for a further 3 hours at 60° C. The reaction mixture is then stirred into 4 l of water, the precipitate is filtered off and the material on the filter is washed with hot water until neutral and dried. 618 g of a 1-nitroanthraquinone mixture of the following composition are thus obtained: 2.5% of anthraquinone, 6.8% of 2-nitroanthraquinone, 75.9% of 1-nitroanthraquinone, 3.0% of 1,6-dinitroanthraquinone, 3.3% of 1,7-dinitroanthraquinone, 3.7% of 1,5-dinitroanthraquinone and 3.2% of 1,8-dinitroanthraquinone.

The yield of 1-nitroanthraquinone is 77.2% of theory.

EXAMPLE 11

280 g of $H_2SO_4$ (78% strength) are initially introduced into a cylindrical reaction vessel, 200 g of anthraquinone are stirred into this and 235 g of $HNO_3$ (98% strength) are added dropwise in the course of 30 minutes, whilst stirring. During this procedure the temperature rises to 47° C. A mixture of 137 g of $H_2SO_4$ (96% strength) and 235 g of $HNO_3$ (98% strength) is then added at a uniform rate in the course of one hour, and during the addition of the last 75% of the mixed acid, 300 g of anthraquinone are added at a uniform rate. During this procedure a temperature of 50° to 52° C. is maintained. The mixture is stirred for a further hour at 50° C. and for a further 2 hours at 60° C. After working up analogously to Example 10, 619 g of a 1-nitroanthraquinone mixture of the following composition are obtained: 1.5% of anthraquinone, 8.2% of 2-nitroanthraquinone, 75.1% of 1-nitroanthraquinone, 3.0% of 1,6-dinitroanthraquinone, 2.9% of 1,7-dinitroanthraquinone, 3.7% of 1,5-dinitroanthraquinone and 2.9% of 1,8-dinitroanthraquinone.

The yield of 1-nitroanthraquinone is 76.6% of theory.

EXAMPLE 12

(A) 305 g of a mixture, in which the reaction has ended, are initially introduced into a cylindrical reaction vessel of 2 l capacity, which is provided with a bottom outlet. 600 g of anthraquinone and a mixed acid consisting of 501 g of sulphuric acid (84% strength) and 595 g of HNO$_3$ (98% strength) are introduced synchronously in the course of 2 hours at 50° to 52° C., whilst stirring vigorously. The mixture is stirred for a further 20 minutes and stirring is then interrupted. Two layers form. The lower inorganic layer (894 g), which is as clear as water, is separated from the upper organic yellow liquid layer through the bottom outlet. After removing an intermediate phase, in order to eliminate false values due to interfacial effects, 1007 g of organic phase remain. About 1/10 of each of the two phases is diluted with an amount of water such that all the anthraquinone compounds precipitate. The mixture is then filtered, the residue is washed until neutral and dried and the filtrate is analysed. The following compositions of the said phases can be calculated from the dry weights of the residues and the analytical date:

inorganic phase: 455 g of H$_2$SO$_4$, 232 g of HNO$_3$, 31 g of anthraquinones and 176 g of water; and organic phase: 61.3 g of H$_2$SO$_4$, 224 g of HNO$_3$, 681 g of anthraquinones and 41 g of water.

The weight ratio of sulphuric acid to nitric acid is 1.98:1 in the inorganic phase and 0.27:1 in the organic phase.

(B) The procedure followed is as described under (A), but after the introduction has ended, the mixture is stirred for a further hour at 50° C. and for a further 3 hours at 60° C. The melt is diluted with an amount of water such that all the anthraquinone compounds precipitate, the mixture is filtered and the weight ratio of sulphuric acid to nitric acid is determined analytically in the filtrate. It is 1.33:1, and has thus shifted significantly in favour of the nitric acid, compared with the inorganic phase from (A). 1,990 g of reaction mixture contain 419 g of HNO$_3$, 558 g of H$_2$SO$_4$ and 751 g of anthraquinones.

EXAMPLE 13

(a) 500 g of anthraquinone are stirred into 420 g of H$_2$SO$_4$ (84% strength) in the course of 5 minutes and 120 g of HNO$_3$ (98% strength) are added at 25° C. in the course of 10 minutes. During this procedure, the temperature rises to 55° C. and the mixture becomes so viscous that it is scarcely still stirrable; on attempting to add a further 120 g of HNO$_3$ at 50°-55° C., the melt thickens so severely that it is no longer stirrable. In spite of intensive cooling, the internal temperature of the melt rises to values above 55°. The reaction can no longer be controlled.

(b) The procedure followed is as described in (a), but an 81.5% strength H$_2$SO$_4$ is employed. In this case also, such a severe thickening begins by adding the nitric acid that the reaction mixture does not remain stirrable.

(c) The procedure followed is as in (a), but the amount of H$_2$SO$_4$ employed is increased by 25%; in this case also, the melt can no longer be stirred after adding about 160 g of HNO$_3$.

In all the experiments (a) to (c), no liquid organic phase appears during the reaction.

What is claimed is:

1. Process for the preparation of 1-nitro-anthraquinone with yields of about 74 to 80% relative anthraquinone employed, by the mononitration of anthraquinone with nitric acid/sulphuric acid mixtures, which consists of nitrating anthraquinone in a nitric acid/sulphuric acid mixture in a two phase system consisting of a liquid organic phase and a liquid inorganic phase, in which the weight ratio of nitric acid to sulphuric acid is about 1:1 to about 2:1, in which the weight ratio of sulphuric acid to anthraquinone is about 0.5:1 to about 1:1 and in which the weight ratio of sulphuric acid to water is about 2.5:1 to about 5.1:1, the weight ratios relating to the sum of the materials employed, the nitric acid being employed in a concentration of about 90 to 100% by weight and the sulfuric acid being employed in a concentration of about 70 to 85% by weight at temperatures in the range from about 45° to 70° C. until the anthraquinone content is less than 3% by weight, relative to the sum of the anthraquinone compounds.

2. Process of claim 1, wherein the nitration is carried out at temperatures in the range from about 48° to 60° C.

3. Process of claim 1, wherein the nitration in the initial phase of the nitration is carried out at temperatures in the range from about 45° to 55° C. and after over 50% of the anthraquinone employed are mononitrated the temperature is increased to about 55° to 70° C.

4. Process of claim 1, wherein the nitration is carried out in a nitric acid/sulphuric acid mixture in which the weight ratio of nitric acid to sulphuric acid is about 1.2:1 to 1.5:1.

5. Process of claim 1, wherein the nitration is carried out in a nitric acid/sulphuric acid mixture in which the weight ratio of sulphuric acid to anthraquinone is about 0.6:1 to 0.8:1.

6. Process of claim 1, wherein the weight ratio of sulphuric acid to water is about 3.5:1 to 5.3:1.

7. Process of claim 1, wherein the entire nitric acid/sulphuric acid mixture is initially introduced and the anthraquinone is introduced into this.

8. Process of claim 1, wherein the nitric acid/sulphuric acid mixture and the anthraquinone are metered separately but synchronously into a mixture in which the reaction has completely or partially ended.

9. Process of claim 1, wherein the process is carried out in a multi-stage reaction cascade and the metering-in of the nitric acid/sulphuric acid mixture and of the anthraquinone is carried out synchronously in a continuous process into the first element of the reaction cascade.

10. Process of claim 1, wherein the metering-in of the nitric acid/sulphuric acid mixture and of the anthraquinone is carried out in a continuous process into a reaction tube.

11. Process of claim 1, wherein the weight ratios indicated are set up by initially introducing a portion of the sulphuric acid, of the water and of the anthraquinone, adding a portion of the nitric acid until an emulsion of a predominantly liquid organic phase and an inorganic phase (H$_2$SO$_4$/HNO$_3$) forms and only then adding the remainder of the anthraquinone, of the nitric acid, of the water and, if appropriate, of the H₂SO₄.

12. Process according to claim 11, wherein in the initial mixture the ratio H₂SO₄/anthraquinone is >1 and the ratio H₂SO₄/H₂O is <3.6.

13. Process according to claim 11, wherein the remaining anthraquinone is added synchronously with or faster than the nitric acid and sulphuric acid.

* * * * *